United States Patent [19]
Kaku et al.

[11] Patent Number: 5,598,434
[45] Date of Patent: Jan. 28, 1997

[54] AUTOMATIC EQUALIZER WITH A BRANCHED INPUT FOR IMPROVED ACCURACY

[75] Inventors: Takashi Kaku; Ryoji Okita; Hideo Miyazawa, all of Kawasaki, Japan

[73] Assignee: Fujitsu Limited, Kanagawa, Japan

[21] Appl. No.: 524,835

[22] Filed: Sep. 7, 1995

[30] Foreign Application Priority Data

Dec. 20, 1994 [JP] Japan .................................. 6-317333

[51] Int. Cl.$^6$ ...................................................... H03H 7/30
[52] U.S. Cl. ......................... 375/230; 375/229; 375/232; 333/18
[58] Field of Search ..................................... 375/229, 230, 375/232, 345; 364/724.19, 724.2; 333/28 R, 17.2, 18, 151, 330

[56] References Cited

U.S. PATENT DOCUMENTS

| | | | |
|---|---|---|---|
| 5,097,482 | 3/1992 | Serizawa et al. | 375/233 |
| 5,189,684 | 2/1993 | Kaku et al. | 375/232 |
| 5,295,157 | 3/1994 | Suzuki et al. | 375/229 |
| 5,305,351 | 4/1994 | Mizoguchi et al. | 375/232 |

FOREIGN PATENT DOCUMENTS

| | | |
|---|---|---|
| 0137213A2 | 4/1985 | European Pat. Off. . |
| 0554120A2 | 8/1993 | European Pat. Off. . |
| WO92/08298 | 5/1992 | WIPO ..................... 375/229 |

Primary Examiner—Stephen Chin
Assistant Examiner—Sean Ingram
Attorney, Agent, or Firm—Nikaido Marmelstein Murray & Oram LLP

[57] ABSTRACT

The invention provides an automatic equalizer which can keep, even where it is employed for a modem which has a very large number of taps, a high degree of accuracy in error correction of tap coefficients and can obtain an equalized signal with a high degree of accuracy. The automatic equalizer includes an equalization calculation section including a plurality of delaying sections, a tap coefficient multiplication section and a totaling calculation section, a tap coefficient error correction section for correcting errors of tap coefficients for the equalization calculation section based on an input to the automatic equalizer and an output of the automatic equalizer, and an input level setting section for setting an input signal level to the equalization calculation section and an input signal level to the tap coefficient error correction section to levels different from each other.

6 Claims, 10 Drawing Sheets

FIG. 7

| AVERAGE INPUT LEVEL dBm | AVERAGE INPUT LEVEL | RECEIVE SIGNAL S/N | BIT ACCURACY, 1L-64L | PEAK VALUE OF Σ OUTPUT | NUMBER OF EQL -9 dBm ASL | OVERALL DECISION |
|---|---|---|---|---|---|---|
| -9 dBm  | 0.354813  | ○ 87 dB | ○ 16.5 | × 23   | ○ *0   | ↑ USED FOR ERROR INTEGRATION |
| -15 dBm | 0.177828  | ○ 81 dB | ○ 15.5 | × 11   | ○ *1.0 |   |
| -21 dBm | 0.089125  | ○ 75 dB | ○ 14.5 | × 6    | ○ *2.0 | ↑ FOR EQL Σ OUTPUT CALCULATION |
| -27 dBm | 0.044668  | ○ 69 dB | ○ 13.5 | ○ 3    | ○ *3.0 |   |
| -33 dBm | 0.022387  | ○ 63 dB | ○ 12.5 | ○ 1.43 | ○ *4.0 |   |
| -39 dBm | 0.011220  | ○ 57 dB | × 11.5 | ○ 0.71 | ○ *5.0 |   |
| -45 dBm | 5.6234⁻³  | × 51 dB | × 10.5 | ○ 0.36 | ○ *6.0 |   |

AUTOMATIC EQUALIZER WITH A BRANCHED INPUT FOR IMPROVED ACCURACY

BACKGROUND OF THE INVENTION

1. Field of the Invention

This invention relates to an automatic equalizer which automatically equalizes transmission distortion or the like of a receive signal, and more particularly to an automatic equalizer suitable for use with a modem having a very high transmission rate, 2. Description of the Related Art Various modems (modulator-demodulators) for use for transmission of data which can transmit data at various rates have been provided conventionally.

Generally, modems having a transmission speed of 9,600 bit/sec (9.6 kbps) or 14.4 kbps represented by the Recommendation V.29 have been put into practical use widely. However, as increase in transmission speed progresses in recent years, very high speed modems having a data transmission rate of 28.8 kbps are being developed energetically.

Modems as described above normally employ an automatic equalizer (which may be hereinafter referred to simply as equalizer) as shown in FIG. 11 in order to compensate, upon reception of data, for deterioration of the data (signal) caused by transmission distortion.

Referring to FIG. 11, the automatic equalizer is generally denoted at 102 and is interposed between an automatic gain control section (AGC) 101 and a signal discrimination section 103. The automatic gain control section 101 adjusts a loop gain so that the level of an inputted demodulated signal may be equal to a predetermined reference level to automatically adjust the level of a receive signal to be inputted to the automatic equalizer 102 at the succeeding stage. Thus, the automatic gain control section 101 is employed so that the automatic equalizer 102 at the succeeding stage may operate accurately.

The automatic equalizer 102 performs equalization processing to correct transmission distortion or the like of a channel. To this end, the automatic equalizer 102 includes an equalizer calculation section 1021 and a tap coefficient error correction section 1022.

Though not shown, the equalizer calculation section 1021 includes, as well known in the art, a plurality of delaying sections for delaying a demodulated signal from the automatic gain control section 101 in time, a tap coefficient multiplication section for multiplying delayed signals from the delaying sections by error information (an error signal) from the tap coefficient error correction section 1022 which will be hereinafter described, and a totaling calculation section for totaling results of the multiplications from the tap coefficient multiplication section. A result of the calculation by the totaling calculation section is outputted as an equalized signal.

The tap coefficient error correction section 1022 receives one of two branched outputs of the automatic gain control section 101 and error information (an error signal) from the signal discrimination section 103, which will be hereinafter described, and produces and outputs, based on the thus received signals, a control signal so that the values of the tap coefficients of the equalizer calculation section 1021 may be corrected to optimum values.

The signal discrimination section 103 performs pre-processing for signal discrimination at a succeeding stage and outputs false reference signal corresponding to an input signal thereto. The signal discrimination section 103 also produces and outputs a false reference signal for the tap coefficient error correction section 1022 of the automatic equalizer 102. Further, the output of the automatic equalizer 102 and the discrimination result output of the signal discrimination section 103 are negatively added to each other (subtracted from each other) to obtain an error signal, which is outputted to the tap coefficient error correction section 1022. An adder 104 is connected so as to negatively add (subtract) an output signal of the signal discrimination section 103 to (from) an input signal to the signal discrimination section 103 to obtain an error signal to be supplied to the tap coefficient error correction section 1022.

Due to the construction described above, with the automatic equalizer shown in FIG. 11, a demodulated signal whose gain is kept fixed by the automatic gain control section 101 is input to the equalizer calculation section 1021. The equalizer calculation section 1021 corrects tap coefficients to optimum values in accordance with a control signal obtained from the tap coefficient error correction section 1022 to per form accurate equalization of the input signal.

In this instance, in the tap coefficient error correction section 1022, required processing such as multiplication or addition is performed on a signal before equalization to be input to the automatic equalizer 102 and an error signal obtained by negative addition of the output of the automatic equalizer 102 in the past and the discrimination result output of the signal discrimination section 103 by the adder 104. A signal obtained by the processing is outputted as a control signal to the equalizer calculation section 1021.

In short, in the conventional automatic equalizer, input data (an input signal) to the automatic equalizer 102 and input data to the tap coefficient error correction section 1022 which is used for error correction are used commonly.

In order to use the automatic equalizer 102 of such a construction as described above for a very high speed modem having a transmission rate of, for example, 28.8 kbps, it is necessary to increase the number of taps of the equalizer 102 very much and lower the level of input data so that the loop gain of the equalizer 102 may be kept equal to or lower than 1.

However, if the level of input data to the automatic equalizer 102 is lowered in this manner, then the accuracy in error correction of the tap coefficients by the tap coefficient error correction section 1022, in which the input data is used, commonly is degraded, and also the accuracy of the automatic equalizer 102 is degraded, which is a subject to be solved with the conventional automatic equalizer.

SUMMARY OF THE INVENTION

It is an object of the present invention to provide an automatic equalizer which can keep, even where it is employed for a modem which has a very high transmission rate and has a very large number of taps, a high degree of accuracy in error correction of tap coefficients and allows equalization processing with a high degree of accuracy.

In order to attain the object described above, according to an aspect of the present invention, there is provided an automatic equalizer, which comprises an equalization calculation section including a plurality of delaying sections, a tap coefficient multiplication section and a totaling calculation section, a tap coefficient error correction section for correcting errors of tap coefficients for the equalization calculation section based on an input to the automatic equalizer and an output of the automatic equalizer, and an input level setting section for setting an input signal level to the equalization calculation section and an input signal level to the tap coefficient error correction section to levels different from each other.

Accordingly, in the automatic equalizer of the present invention, when an input signal is to be equalized by the equalization calculation section, the input signal level to the equalization calculation section and the input signal level to the tap coefficient error correction section are set to levels different from each other. Then, based on the signal to the coefficient error correction section, errors of the tap coefficients for the equalization calculation section can be corrected. Consequently, equalization processing by the equalization calculation section and error correction processing by the tap coefficient error correction section can be performed independently of each other using signals of different levels from each other for the equalization processing and the error correction processing. Accordingly, even if the number of taps of the equalizer is increased, the accuracy in error correction processing by the tap coefficient error correction section can be maintained high.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 7 is a table illustrating an optimum input level to the automatic equalizer shown in FIG. 5;

DESCRIPTION OF THE PREFERRED EMBODIMENT a. Aspect of the Invention

Figure 1:
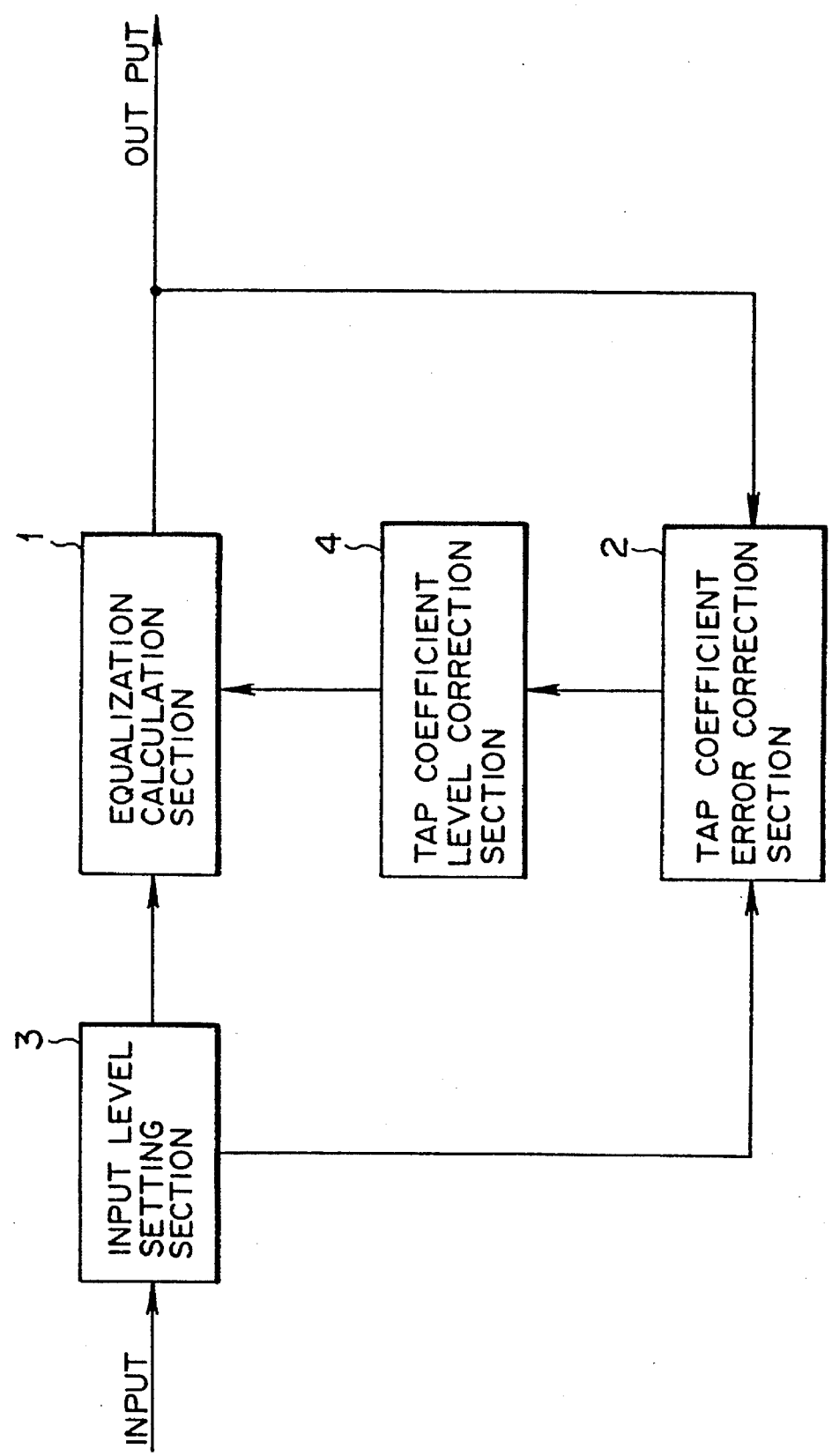
FIG. 1 is a block diagram illustrating an aspect of the present invention.

Referring first to FIG. 1, there is shown, in the block diagram, an automatic equalizer according to an aspect of the present invention. The automatic equalizer shown includes an equalization calculation section 1, a tap coefficient error correction section 2, an input level setting section 3, and a tap coefficient level correction section 4. Though not shown, the equalization calculation section 1 includes a plurality of delaying sections, a tap coefficient multiplication section and a totaling calculation section.

The tap coefficient error correction section 2 corrects errors of tap coefficients for the equalization calculation section 1 based on an input to the automatic equalizer and an output of the automatic equalizer. The input level setting section 3 sets the input signal level to the equalization calculation section 1 and the input signal level to the tap coefficient error correction section 2 to levels different from each other.

Consequently, in the automatic equalizer of the present invention shown in FIG. 1, when an input signal is to be equalized by the equalization calculation section 1, the input level setting section 3 sets the input signal level to the equalization calculation section 1 and the input signal level to the tap coefficient error correction section 2 to levels different from each other. Then, based on the signal to the top coefficient error correction section 2, the tap coefficient error correction section 2 can correct errors of the tap coefficients for the equalization calculation section 1.

In short, by setting the input signal level to the equalization calculation section 1 and the input signal level to the tap coefficient error correction section 2 to the levels different from each other by means of the input level setting section 3, the equalization processing by the equalization calculation section 1 and the error correction processing by the tap coefficient error correction section 2 can be performed using signals of different levels from each other.

Accordingly, with the automatic equalizer of the present invention described above, equalization processing by the equalization calculation section 1 and error correction processing by the tap coefficient error correction section 2 can be performed independently of each other using signals of different levels from each other, and consequently, even if the number of taps of the equalizer is increased, the accuracy in error correction processing by the tap coefficient error correction section 2 can be maintained.

Though not shown, the input level setting section 3 includes a branching section for branching an input signal into two systems, and a level variation section for varying the level of one of the branched signals branched by the branching section which is to be inputted to the equalization calculation section 1. Further, the level variation section varies the level of the signal to the equalization calculation section 1 so as to secure a bit accuracy necessary for error correction of the output of the equalizer.

Accordingly, with the automatic equalizer of the present invention described above, the input signal level to the equalization calculation section 1 and the input signal level to the tap coefficient error correction section 2 can be set to the levels different from each other with certainty. Further, since, in this instance, the level of the signal to the equalization calculation section 1 is varied so that the bit accuracy necessary for error correction of the output of the equalizer may be secured, error correction can be performed with a higher degree of accuracy.

Further, the automatic equalizer is constructed such that one of the branched signals branched by the branching section of the input level setting section 3 which is to be inputted to the tap coefficient error correction section 2 is inputted to the tap coefficient error correction section 2 after a delay corresponding to a delay provided by the equalization calculation section 1.

Thus, one of the branched signals branched by the branching section of the input level setting section 3 which is to be inputted to the tap coefficient error correction section 2 is inputted to the tap coefficient error correction section 2 after delayed corresponding to a delay provided by the equalization calculation section 1. Consequently, the input timings of the two signals to be inputted to the tap coefficient error correction section 2 coincide with each other. Accordingly, error correction by the tap coefficient error correction section 2 can be performed with certainty.

The tap coefficient level correction section 4 mentioned above corrects the output level of the tap coefficient error correction section 2 so that the automatic equalizer may have a loop gain equal to or lower than 1. In this instance, the tap coefficient level correction section 4 corrects the output level of the tap coefficient error correction section 2 based on an input signal to the automatic equalizer and taking a number of taps of the automatic equalizer into consideration.

Accordingly, with the automatic equalizer of the present invention described above, since the output level of the tap coefficient error correction section 2 can be corrected by the tap coefficient level correction section 4 so that the loop gain of the equalizer may be equal to or lower than 1, an equalizer output of a high degree of accuracy can be obtained without suffering from an overflow of any of the tap coefficients of the equalizer. Further, since, in this instance, the output level of the tap coefficient error correction section 2 can be corrected based on an input signal to the equalizer and taking the number of taps of the equalizer into consideration, even if the number of taps of the equalizer is increased, error correction of the tap coefficients can be performed while maintaining a high degree of accuracy.

b. Embodiment of the Invention

Figure 2:
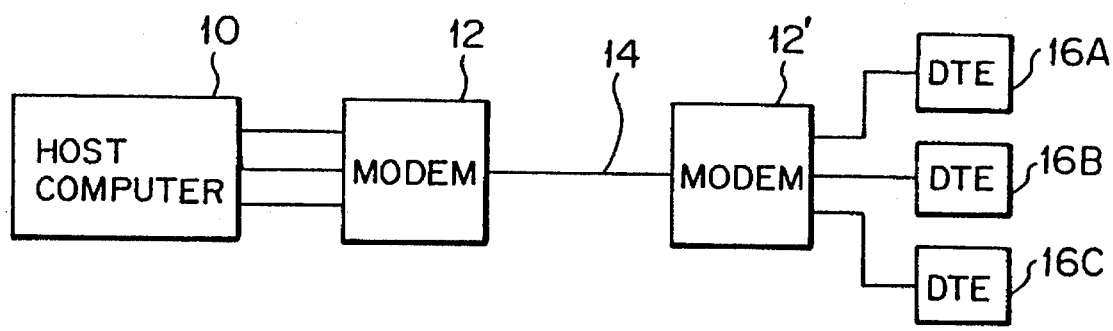
FIG. 2 is a block diagram of an on-line system in which an automatic equalizer to which the present invention is applied is incorporated.

Referring now to FIG. 2, there is shown in block diagram an on-line system in which an automatic equalizer to which the present invention is applied is incorporated. The on-line system shown includes a host computer 10, and a modem 12 to which the host computer 10 is connected by way of a communication control apparatus (CCP) not shown. Another modem 12' installed at another location is connected to the modem 12 by way of an analog line (privately used line) 14. Terminals 16A to 16C serving as work stations are connected to the modem 12'.

Each of the modems 12 and 12' is constructed as a very high speed modem having a transmission rate of, for example, 28.8 kbps and operates, for example, such that it time division processes data of a main channel for three main data and a secondary channel for secondary data for supervision of the network, modulates the thus processed data and transmits the thus modulated data by a non-Nyquist transmission system, and demodulates a receive signal to reproduce data (main data and secondary data). Further, as well known in the art, each of the modems 12 and 12' transmits, prior to transmission of data, training data so that initialization processing of the receiving section can be performed making use of the training data.

Figure 4:
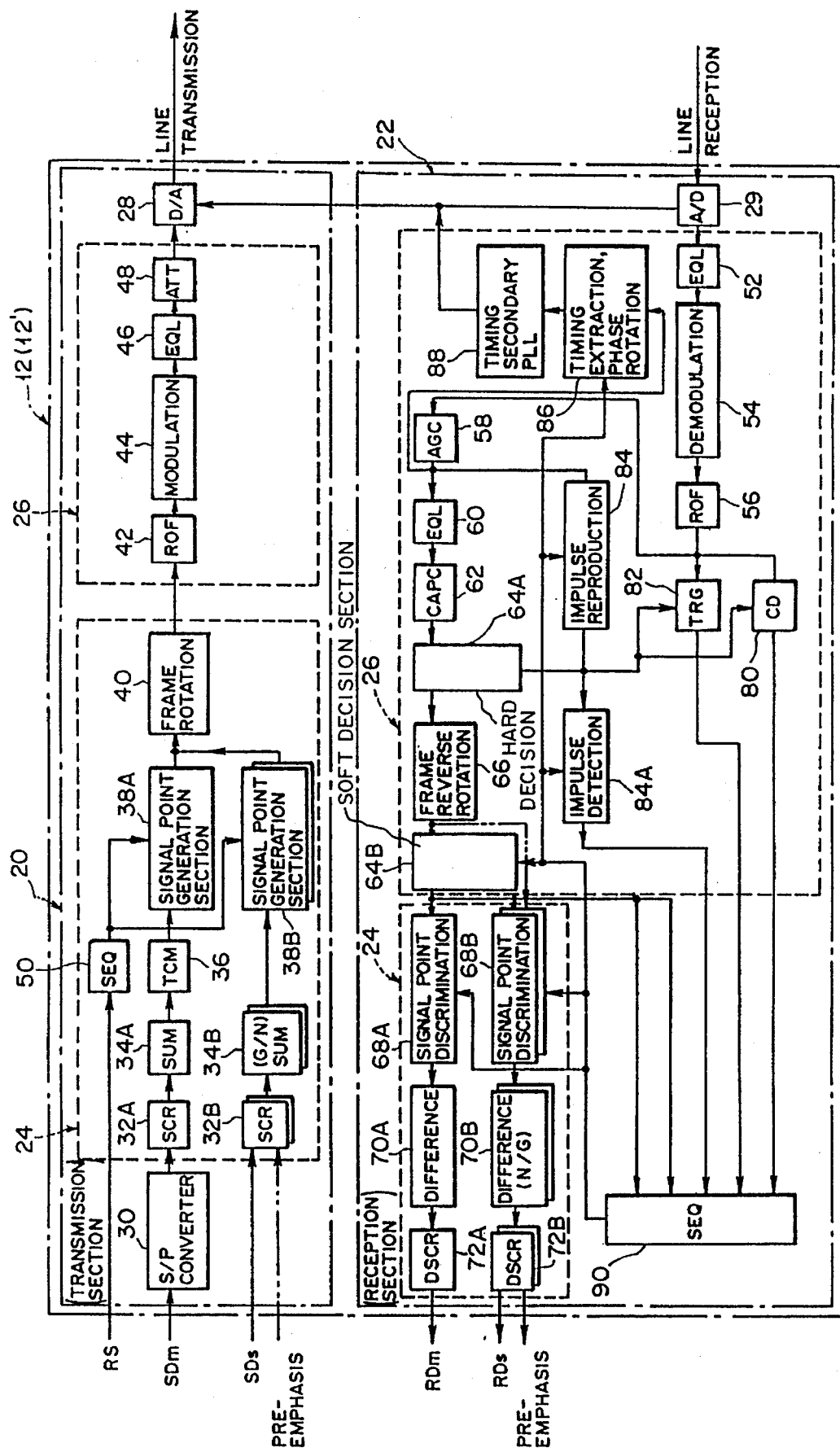
FIG. 4 is a block diagram showing a detailed construction of the modem employed in the on-line system of FIG. 2.

The modem 12 which serves as a parent station includes, in order to exhibit such functions as described above, a transmission section 20 with a modulation function and a reception section 22 with a demodulation function as shown in FIG. 4. Further, a transmission low-pass filter and a transmission amplifier not shown are provided on the output side of the transmission section 20, and a reception amplifier and a reception low-pass filter not shown are provided on the input side of the reception section 22.

Figure 3:
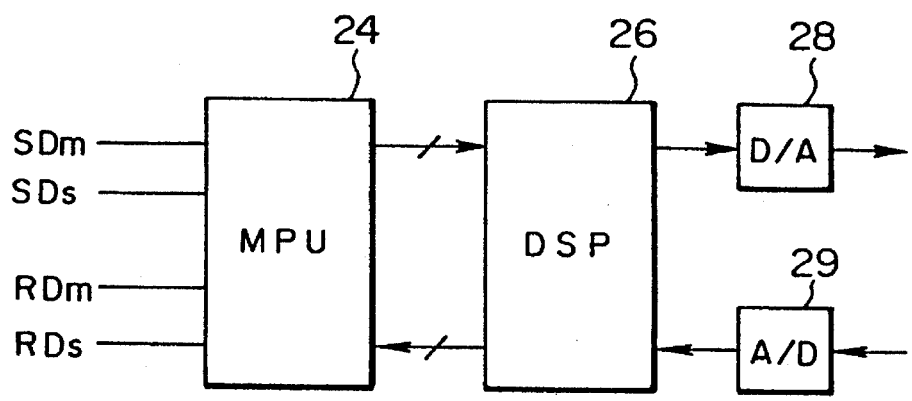
FIG. 3 is a block diagram showing a construction of a modem employed in the on-line system of FIG. 2.

Referring to FIG. 3, each of the transmission section 20 and the reception section 22 includes a microprocessor unit (MPU) 24, a digital signal processor (DSP) 26, a D/A (digital to analog) converter 28 and an A/D (analog to digital) converter 29. It is to be noted that the MPU 24 or the DSP 26 constituting the transmission section 20 or the reception section 22 is suitably provided by a plural number depending upon the capacity or the processing capability of the same.

Essential part of the modem 12 will be described in detail below. Referring back to FIG. 4, the transmission section 20 of the modem 12 shown includes a serial to parallel converter (S/P converter) 30, a pair of scramblers (SCR) 32A and 32B, a pair of sum calculation sections 34A and 34B, a trellis-coded modulation section (TCM) 36, a pair of signal point generation sections 38A and 38B, a frame rotation section 40, a roll-off filter (ROF) 42, a modulation section 44, a fixed equalization section (EQL) 46, an attenuator (ATT) 48, a sequencer (SEQ) 50 serving as a control section, and so forth.

The S/P converter 30 converts main channel data SDm from serial data into parallel data. The scramblers 32A and 32B individually randomize signals (main channel data SDm and secondary data SDs, and pre-emphasis data).

The sum calculation section 34A performs summing calculation of the output of the scrambler 32A, and the sum calculation section 34B performs summing calculation of the output of the scrambler 32B. The sum calculation section 34B also has a gray/natural code converting (G/N converting) function which is used upon training. The reason why summing calculation of data is performed by both of the sum calculation sections 34A and 34B is that it is intended to transmit transmission data as relative difference data between two preceding and succeeding data with respect to time. The trellis-coded modulation section 36 performs processing for correcting an error.

The signal point generation sections 38A and 38B generate desired signal points based on main data SDm and secondary data SDs, respectively. Upon initialization, the signal point generation sections 38A and 38B produce training data in response to a control signal from the sequencer 50.

When a step-out condition occurs, the frame rotation section 40 rotates a frame in order to perform re-drawing in. The roll-off filter 42 passes only a signal of a digital output within a predetermined frequency range and functions as a low-pass filter.

The modulation section 44 performs modulation processing of the output of the roll-off filter 42. The carrier frequency of the modulation section 44 is set, for example, to 1,850 Hz.

The fixed equalization section 46 equalizes a delay, an amplitude component on a channel or the like. The attenuator 48 performs level adjustment of the output of the fixed equalization section 46.

The sequencer 50 serving as a control section controls the functions 30 to 48 of the transmission section 20. Further, upon initialization, the sequencer 50 controls the signal point generation sections 38A and 38B so as to produce training data.

It is to be noted that the MPU 24 has the functions of the scramblers 32A and 32B, the sum calculation sections 34A and 34B, the trellis-coded modulation section 36, the signal point generation sections 38A and 38B, the frame rotation section 40 and the sequencer 50 in the transmission section 20, and the DSP 26 has the functions of the roll-off filter 42, the modulation section 44, the fixed equalization section 46 and the attenuator 48.

Meanwhile, the reception section 22 of the modem 12 includes a fixed equalizer 52, a demodulation section 54, a roll-off filter (band-separation filter) 56, an automatic gain control section (AGC) 58, an automatic equalizer (EQL) 60, a carrier phase correction section (CAPC) 62, a hard decision section 64A, a frame reverse rotation section 66, a soft decision section 64B, a pair of signal point discrimination sections 68A and 68B, a pair of difference calculation sections 70A and 70B, and a pair of descramblers 72A and 72B. The reception section 22 further includes a carrier detection section (CD) 80, a training data detection section (TRG) 82, an impulse reproduction section 84, an impulse detection section 84A, a timing extraction section 86, a timing locking section 88, a sequencer 90 serving as a control section, and so forth.

The fixed equalizer 52 equalizes a delay, an amplitude component on a channel or the like. The demodulation section 54 performs demodulation processing for a receive signal after digital conversion by the A/D converter 29. The roll-off filter 56 passes therethrough only a signal of a digital output of the demodulation section 54 within a predetermined frequency range. In the present embodiment, for example, a decimation filter is employed for the roll-off filter 56.

The automatic gain control section 58 constructs receive level automatic adjustment means which adjusts the loop gain so that the level of a demodulated signal after bandwidth limitation by the roll-off filter 56 may be equal to a predetermined reference value and inputs the demodulated signal of the predetermined reference level to the automatic equalizer 60 at the succeeding stage. The automatic gain control section 58 is required to allow the automatic equalizer 60 at the succeeding stage to operate accurately.

The automatic equalizer 60 performs equalization processing to correct transmission distortion or the like of the channel. The carrier phase correction section 62 predicts and removes (or restrains) a frequency offset, a phase jitter or a phase intercept variation from the output of the automatic equalizer 60 to correct the phase of the carrier.

The hard decision section 64A outputs a false reference signal corresponding to an input signal thereto. The soft decision section 64B receives a false reference signal from the hard decision section 64A and performs viterbi decoding or the like of the false reference signal to perform error correction. The hard decision section 64A and the soft decision section 64B function as a signal pre-discrimination section.

The frame reverse rotation section 66 is provided to prevent a step-out condition. The signal point discrimination section 68A discriminates signal points of main data. The signal point discrimination section 68B discriminates, in an ordinary operation, signal points of secondary data, but discriminates, upon training, the output of the frame reverse rotation section 66 (secondary data before discrimination by the soft decision section 64B is performed) among four values.

The difference calculation section 70A performs difference calculation of the output of the signal point discrimination section 68A while the difference calculation section 70B performs difference calculation of the output of the signal point discrimination section 68B. The difference calculation section 70B further has a gray/natural code converting (G/N converting) function which is used upon training. Further, the difference calculation sections 70A and 70B have a function of restoring original data from transmitted relative difference data.

The descramblers 72A and 72B descramble signals in a scrambled condition and output resulted signals as main data RDm and secondary data RDs, respectively.

The carrier detection section 80 detects a carrier to detect whether or not data has been received. The output of the carrier detection section 80 is supplied to the sequencer 90.

The training data detection section 82 detects training data to detect the beginning of training. Also the output of the training data detection section 82 is supplied to the sequencer 90.

The impulse reproduction section 84 reproduces an impulse from training data and, in this instance, can reproduce a desired impulse. The impulse detection section 84A detects an impulse reproduced by the impulse reproduction section 84, and also the output of the impulse detection section 84A is supplied to the sequencer 90.

The timing extraction section 86 extracts a signal timing from the output of the automatic gain control section 58 to discriminate where the signal timing is. The timing locking section 88 locks the output of the timing extraction section 86 using a PLL circuit.

The sequencer 90 serving as a control section controls the function sections 52 to 88 of the reception section 22.

It is to be noted that a line indicated by a chain line in each of the secondary data transmission and reception systems of FIG. 4 indicates the line upon training. Meanwhile, the DSP 26 has the functions of the fixed equalizer 52, the demodulation section 54, the roll-off filter 56, the automatic gain control section 58, the automatic equalizer 60, the carrier phase correction section 62, the hard decision section 64A, the frame reverse rotation section 66, the soft decision section 64B, the carrier detection section 80, the training data detection section 82, the impulse reproduction section 84, the impulse detection section 84A, the timing extraction section 86 and the timing locking section 88 in the reception section 22, and the MPU 24 has the functions of the signal point discrimination sections 68A and 68B, the difference calculation sections 70A and 70B, and the descramblers 72A and 72B in the reception section 22.

It is to be noted that also the modem 12' which serves as a child station has the same construction as that of the modem 12 serving as a parent station, and accordingly, description of the construction of the modem 12' is omitted herein to avoid redundancy.

In the following, operation of the entire on-line system having the construction described above will be described. First, in the transmission section 20, main channel data SDm is converted from serial data into parallel data by the S/P converter 30 and then scrambled by the scrambler 32A. Then, the output of the scrambler 32A is processed by sum calculation section 34A so that relative difference data is produced. The relative difference data is processed for error correction by the trellis-coded modulation section 36, and desired signal points are generated from the output of the trellis-coded modulation section 36 by the signal point generation section 38A.

Meanwhile, also secondary data SDs is scrambled by the scrambler 32b and then processed by sum calculation by the sum calculation section 34B so that relative difference data is produced. Then, desired signal points are generated from the relative difference data by the signal point generation section 38A.

Thereafter, the outputs of the signal point generation sections 38A and 38B pass the frame rotation section 40 and are filtered by the roll-off filter 42, whereafter they are modulated by the modulation section 44. Further, the signal obtained by the modulation is supplied to the fixed equalization section 46, by which a delay, an amplitude component on a channel and so forth of the signal are equalized. The output of the fixed equalization section 46 is adjusted in level by the attenuator 48 and then converted from a digital signal into an analog signal by the D/A converter 28, whereafter it is transmitted on a transmission line by the non-Nyquist transmission method.

In the reception section 22, a receive signal is converted from an analog signal into a digital signal by the A/D converter 29 and then supplied to the fixed equalizer 52, by which a delay, an amplitude on a channel and so forth of the receive signal are equalized. The output of the fixed equalizer 52 is demodulated by the demodulation section 54 and then filtered by the roll-off filter 56, whereafter the receive level with which the demodulated signal is to be inputted to the automatic equalizer 60 at the succeeding stage is automatically adjusted by the automatic gain control section 58 by adjustment of the loop gain so that the level of the demodulated signal may become equal to a predetermined reference value.

The automatic equalizer 60 performs equalizing processing for correction of transmission distortion or the like of the transmission line. Further, the carrier phase of the output of the automatic equalizer 60 is corrected by the carrier phase correction section 62, and signal pre-discrimination of the carrier phase correction section 62 is performed by the hard decision section 64A and the soft decision section 64B. Thereafter, the signal points of the main data are discriminated by the signal point discrimination section 68A, and the signal points of the secondary data are discriminated by the signal point discrimination section 68B.

Thereafter, the main data and the secondary data are processed by difference calculation processing and descrambling processing separately from each other.

Consequently, stabilized very high speed data transmission can be realized without using any data compression processing, and a modem having a high degree of reliability can be provided.

Now, the automatic equalizer (EQL) 60 according to the present invention which is employed in the reception section 22 of the very high speed modem described above will be described in detail.

Figure 5:
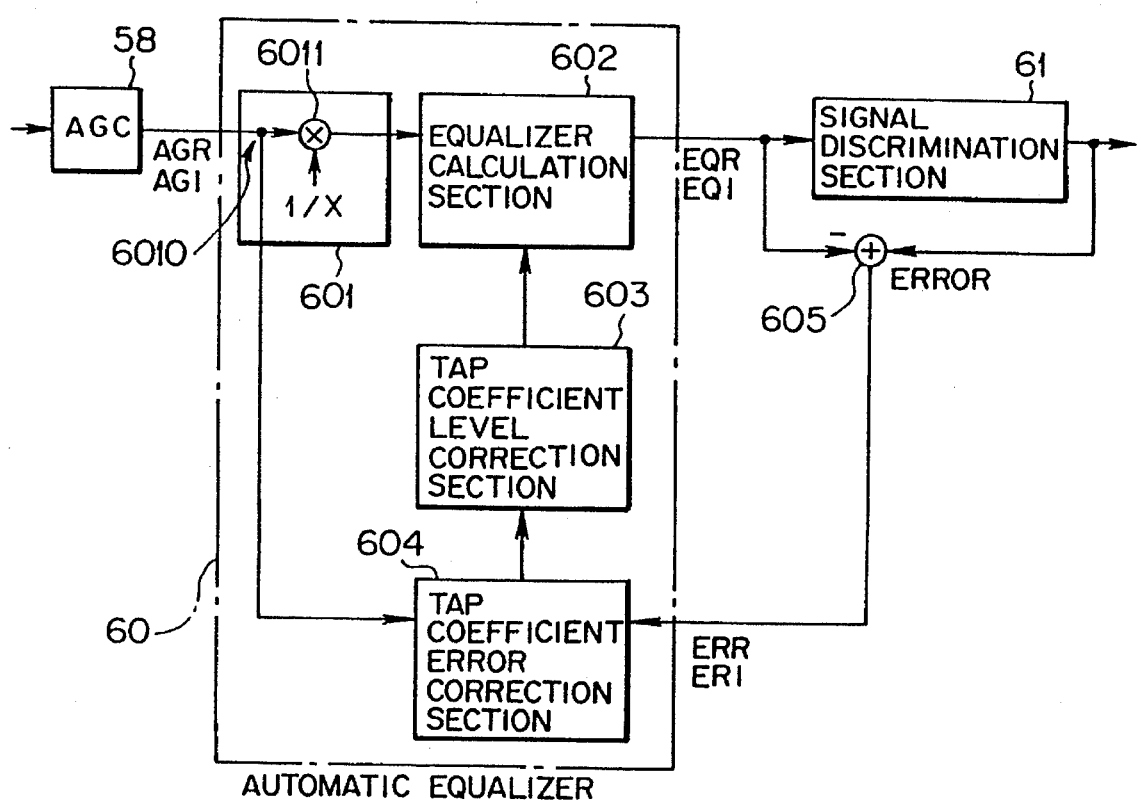
FIG. 5 is a block diagram showing a construction of an automatic equalizer according to the present invention which is incorporated in the modem shown in FIG. 3 or 4.
Figure 6:
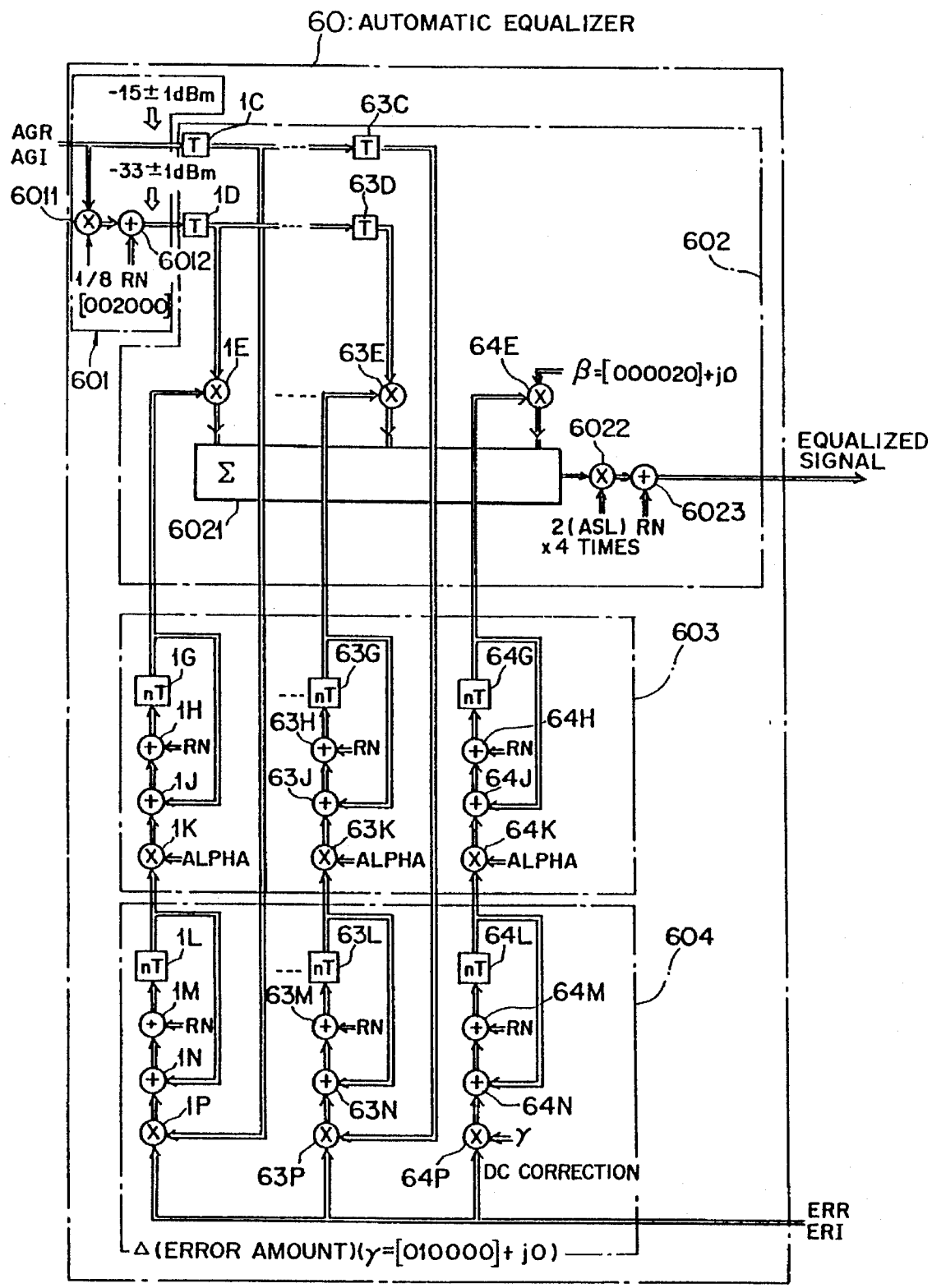
FIG. 6 is a block diagram showing a detailed construction of the automatic equalizer shown in FIG. 5.

Referring now to FIGS. 5 and 6, there is shown a construction of an automatic equalizer according to a preferred embodiment of the present invention. The automatic equalizer (which may be hereinafter referred to merely as equalizer) shown is generally denoted at 60 and includes an input level setting section 601, an equalizer calculation section 602, a tap coefficient level correction section 603 and a tap coefficient error correction section 604. It is to be noted that the automatic gain control section (AGC) 58 shown in FIG. 5 is similar to that described hereinabove with reference to FIG. 4, and a signal discrimination section 61 corresponds to the signal pre-discrimination section constituted from the hard decision section 64A and the soft decision section 64B shown in FIG. 4. It is to be noted that an adder 605 is connected between the input and the output of the signal discrimination section 61 and negatively adds input and output signals (data) to and from the signal discrimination section 61 to obtain an error signal (error amount) for the tap coefficient error correction section 604 which will be hereinafter described.

The input level setting section 601 sets the input signal level to the equalizer calculation section 602 to a level different from the input signal level to the tap coefficient error correction section 604 which will be hereinafter described. In particular, a branching section 6010 of the input level setting section 601 branches an input signal thereto into two systems, and a multiplier 6011 constituting a level variation section multiplies the level of one of the branched signals to be supplied to the equalizer calculation section 602 by 1/X (where X<1) to vary the input signal level. It is to be noted that, in FIG. 6, the value by which the input signal is multiplied by the multiplier 6011 is set to "X=8". The input level setting section 601 further includes an adder 6012 which performs rounding processing (RN) of an inputting signal multiplied by ⅛ by the multiplier 6011 of the input level setting section 601.

The equalizer calculation section 602 performs equalization (calculation) of an input signal thereto from the input level setting section 601 using error correction signals from the tap coefficient level correction section 603. The equalizer calculation section 602 includes, as seen from FIG. 6, 63 pairs of delaying sections (T) 1C to 63C and 1D to 63D, 64 tap coefficient multiplication sections 1E to 64E and a totaling calculation section 6021.

The delaying sections 1C to 63C successively delay one of a pair of branched signals of an input signal to the automatic equalizer 60 branched by the input level setting section 601 in time and output the thus delayed signals to the tap coefficient error correction section 604 which will be hereinafter described. The delaying sections 1D to 63D similarly delay the input signal, which has been branched by the input level setting section 601 and has a signal level varied to ⅛ by the input level setting section 601, and output the thus delayed signals to the tap coefficient multiplication sections 1E to 63E, respectively. In short, the signal branched by the input level setting section 601 to the tap coefficient error correction section 604 is supplied to the tap coefficient error correction section 604 after it is delayed corresponding to the delays of the input signal by the delaying sections 1C to 63C of the equalizer calculation section 602.

The tap coefficient multiplication sections 1E to 63E multiply signals obtained by successively delaying an input signal by the delaying sections 1D to 63D by corresponding error correction signals from the tap coefficient level correction section 603 which will be hereinafter described. The totaling calculation section 6021 adds all of data obtained by multiplications by the tap coefficient multiplication sections 1E to 64E. It is to be noted that the tap coefficient multiplication in section 64E multiplies "β" place of the input signal by a corresponding error correction signal from the tap coefficient level correction section 603.

The tap coefficient level correction section 603 corrects the output level of the tap coefficient error correction section 604 so that the loop gain of the entire equalizer 60 may be equal to or lower than 1. The tap coefficient level correction section 603 includes, as shown in FIG. 6, 64 delaying sections (nT) 1G to 64G, 64 pairs of adders 1H to 64H and 1J to 64J, and 64 multipliers 1K to 64K. The multipliers 1K to 64K multiply the outputs of the tap coefficient error correction section 604 by data "ALPHA" for adjustment of the signal level. The outputs of the multipliers 1K to 64K are individually integrated successively by being added to data of such outputs in the past delayed by the delaying sections 1G to 64G by the adders 1J to 64J, respectively. The output levels of the tap coefficient error correction section 604 are corrected by such integration. It is to be noted that the adders 1H to 64H perform rounding processing (RN) of the outputs of the adders 1J to 64J, respectively.

The tap coefficient error correction section 604 produces error correction signals based on an input signal from the input level setting section 601 before the signal level is varied by the input level setting section 601 and an error signal obtained by negative addition (subtraction) of the input and the output to and from the signal discrimination section 61 by the adder 605, and outputs the thus produced error correction signals to the tap coefficient level correction section 603 to allow corrections of errors of tap coefficients for the equalizer calculation section 602.

To this end, the tap coefficient error correction section 604 includes, as shown in FIG. 6, 64 delaying sections (nT) 1L to 64L, 64 pairs of adders 1M to 64M and 1N to 64N, and 64 multipliers 1P to 64P. The multipliers 1P to 64P multiply input signals thereto from the input level setting section 601 by an error signal (refer to FIG. 5) obtained by subtraction between an input signal and an output signal to and from the signal discrimination section 61. The outputs of the multipliers 1P to 64P are individually integrated successively by being added to data of such outputs in the past delayed by the delaying sections 1L to 64L by the adders 1N to 64N, respectively, thereby to produce error correction signals to be outputted to the tap coefficient level correction section 603. It is to be noted that also the adders 1M to 64M perform rounding processing (RN) of the outputs of the adders 1J to 64J, respectively.

Operation of the automatic equalizer 60 of the present invention having the construction described above will be described in detail below.

First, when a receive signal of the modem outputted from the automatic gain control section 58 (refer to FIG. 5) is inputted to the automatic equalizer 60, the receive signal is branched into two systems by the input level setting section 601. One of the branched receive signals is successively delayed by the delaying sections 1C to 63C and outputted to the tap coefficient error correction section 604. The other branched receive signal is multiplied by ⅛ by the multiplier 6011 so that the signal level thereof is varied. Then, the output of the multiplier 6011 is rounded by the adder 6012 and then outputted to the tap coefficient multiplication sections 1E to 63E.

In short, the input signal is branched into two systems by the input level setting section 601, and the level of one of the thus branched signals to the equalizer calculation section 602 can be made different from the input signal level to the tap coefficient error correction section 604 with certainty by the multiplier (level variation section) 6011.

Consequently, since signals of different levels are used for equalization processing by the equalizer calculation section 602 and error correction processing by the tap coefficient error correction section 604, the equalization processing and the error correction processing can be performed independently of each other, and accordingly, even where the automatic equalizer 60 uses a very great number of tap coefficients and is used for a reception section (such as the reception section 22 in FIG. 4) of a very high speed modem (whose transmission rate is, for example, 28.8 kbps), the accuracy in error correction processing of the tap coefficient error correction section 604 can be maintained.

Referring to FIG. 6, the value of ⅛ is multiplied to the input signal by the multiplier 6011, the multiplication value by the multiplier 6011 is set so as to secure a degree of bit accuracy necessary for error correction of the output of the totaling calculation section 6021, that is, the output of the automatic equalizer 60 (that is, a number of bits necessary for an input signal ERR, ERI to the tap coefficient error correction section 604). As a result, error correction with a higher degree of accuracy can be performed.

In particular, as seen from FIG. 7, the automatic equalizer 60 has a particular level signal with which the S/N ratio, the bit accuracy, the peak value of the output of the automatic equalizer 60 and so forth exhibit optimum values with respect to an average input level of the automatic equalizer 60. Accordingly, the multiplication value (⅛) of the multiplier 6011 of the input level setting section 601 is set so that a signal level (for example, "−15±1 dB") suitable to obtain an error correction signal (for error integration) and another signal level (for example, "−33±1 dB") suitable for calculation by the totaling calculation section 6021 (for EQL $\Sigma$ output calculation) may be input signals to the tap coefficient error correction section 604 and the totaling calculation section 6021 (tap coefficient multiplication sections 1E to 63E), respectively, based on the particular level signal.

It is to be noted that, in FIG. 7, the lowest necessary S/N ratio of a receive signal is higher than 60.20−8.64=51.56 dB, that is, higher than about 52 dB where an ordinary eye pattern deterioration (EYE deterioration) is assumed to be 25%. Meanwhile, where the multiplication value at the center tap (in the present embodiment, the tap coefficient multiplication section 32E) of the automatic equalizer 60 is assumed to be 1.04 and the number of taps is 63, since it is experimentally known that it is only required for the peak value of the output of the totaling calculation section 6021 ($\Sigma$) to have a margin equal to 16 times the peak value of the input signal (1.04×63/2/2=16.38), it can be seen that it is required that a value 16×4 times an average input level (peak factor 12 dB) do not exceed 2.00.

Figure 11:
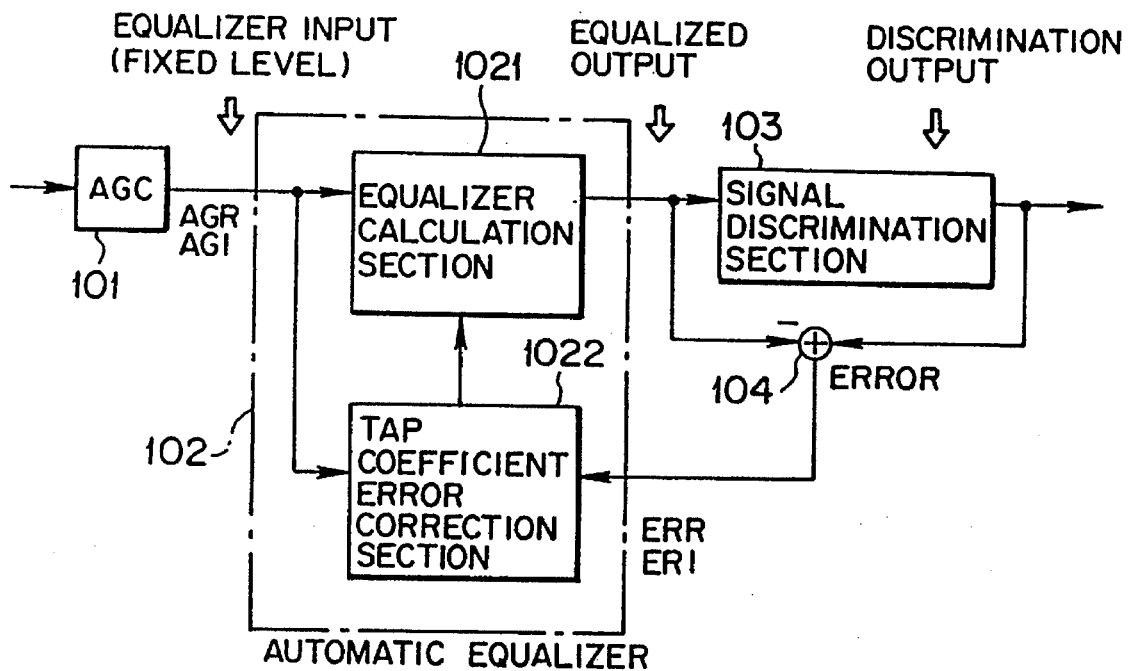
FIG. 11 is a block diagram showing a construction of a general automatic equalizer.

Accordingly, even if the value of any of the tap coefficients grows abnormally, the tap value does not exceed 2.00. Further, even if the value of a tap coefficient becomes equal to 2.00, since the output value of the totaling calculation section 6021 which is an equalization output is 1.43×2= 2.86<4.0, there is no problem with the system. It is to be noted that it can be recognized readily that such setting as described above is impossible with the equalizer described hereinabove with reference to FIG. 11 because the number of systems of input signals to the automatic equalizer 60 is only one.

The input to section 602 by the input level setting section 601 (multiplier 6011) as described above is successively delayed by the delaying sections 1D to 63D. The signals thus delayed by the delaying sections 1D to 63D are output to the tap coefficient multiplication sections 1E to 63E, respectively, by which they are multiplied by the respective outputs of the tap coefficient level correction section 603, and all of the outputs of the tap coefficient multiplication sections 1E to 63E are added by the totaling calculation section 6021.

The output of the totaling calculation section 6021 is multiplied by a value (2 (ASL)×4, that is, $2^4$) by a multiplier 6022, and the output of the multiplier 6022 is rounded (RN) by an adder 6023 to obtain an equalized signal. The equalized signal is outputted to the signal discrimination section 61 (refer to FIG. 5).

It is to be noted that, in this instance, the tap coefficient multiplication section 64E multiplies data of "β=000020+j0) in place of the input signal by the output (data) of the tap coefficient level correction section 603, and the resulted data is inputted to the totaling calculation section 6021 to compensate for the bit accuracy necessary for error correction by the automatic equalizer 60. Further, for the data from the tap coefficient level correction section 603 to the tap coefficient multiplication section 64E, data obtained by multiplying data of "=010000+j0" in place of the input signal (AGR, AGI) by an error signal (ERR, ERI) by a multiplier 64P in the tap coefficient error correction section 604 to perform dc correction of an error of a tap coefficient is used. The values "000020" and "010000" are values corresponding to calculation errors.

By the way, the output signals of the tap coefficient level correction section 603 to be multiplied by the input signal by the tap coefficient multiplication sections 1E to 64E described above are obtained by feeding back an error signal (error: ERR, ERI) obtained from the output of the automatic equalizer 60 (totaling calculation section 6021) by way of the signal discrimination section 61 (refer to FIG. 5) to the tap coefficient error correction section 604.

Figure 8:
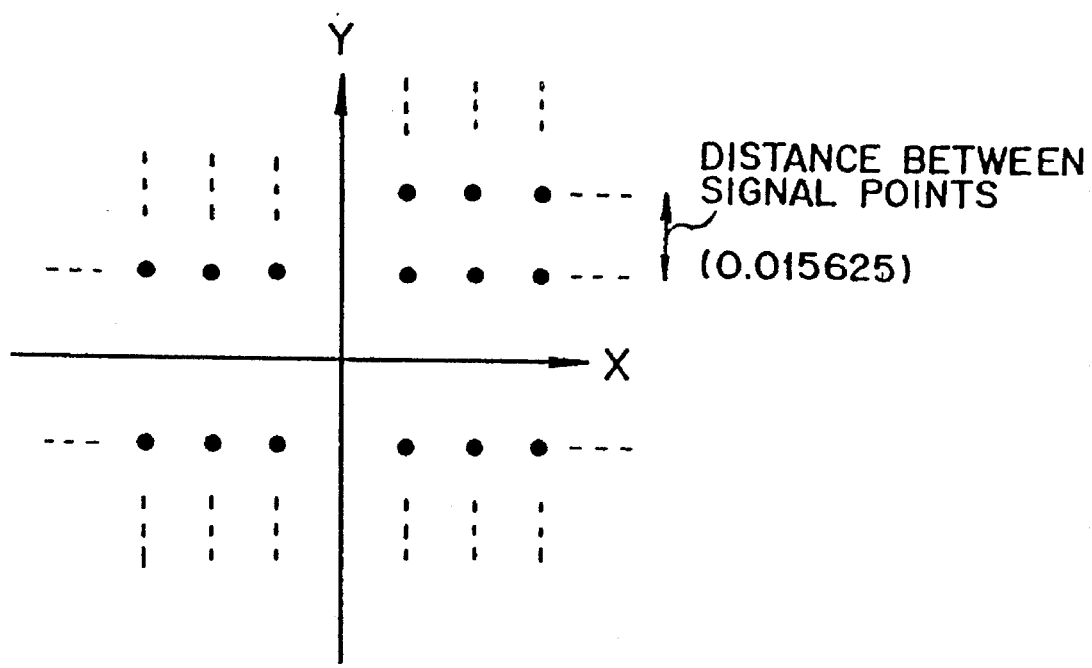
FIG. 8 is a diagrammatic view showing an example of signal points on an eye pattern by the automatic equalizer shown in FIG. 5.

Here, where the automatic equalizer 60 is used for a reception section (such as the reception section 22 in FIG. 4) of a very high speed modem whose transmission speed is, for example, 28.8 kbps, since the number of signal points on an eye pattern is very great comparing with those of usual modems having a transmission speed of 9.6 kbps or 14.4 kbps as seen from FIG. 8, the distance between the signal points decreases as much (in FIG. 8, 0.015625).

As a result, the number of bits required for an error signal (ERR, ERI) increases as much. In particular, where the average level of noise is represented by "N" and the peak factor of the noise is 12 dB, since N=0.015625/4 (25%)/4 (12 dB)=0.0009765625 (−60.20 dBm) (where "25%" indicates an aimed value of the eye pattern deterioration), the required bit number n for the error signal (ERR, ERI) is 2/0.0009765625×2=4,096, that is, 12 bits. Accordingly, the error signal (ERR, ERI) must keep the bit accuracy of 12 bits until it is fed back to the tap coefficient error correction section 604.

Then, when the error signal (ERR, ERI) is fed back to the tap coefficient error correction section 604 as seen from FIG. 6, in the tap coefficient error correction section 604, signals obtained by successively delaying one of the branched input signals branched by the input level setting section 601 without variation of the signal level thereof are multiplied by the error signal (ERR, ERI) by the multipliers 1P to 63P, respectively, and such outputs of the multipliers 1P to 63P are individually integrated successively by being successively added to data in the past delayed by the delaying sections 1L to 64L by the adders 1N to 64N, respectively, so that error correction signals for the tap coefficient multiplication sections 1E to 63E of the equalizer calculation section 602 are obtained and outputted to the tap coefficient level correction section 603.

Then, in the tap coefficient level correction section 603, the error correction signals from the tap tap coefficient error correction section 604 and the data "ALPHA" for controlling the automatic equalizer 60 so that the loop gain of the automatic equalizer 60 may be equal to or lower than 1 are multiplied by the multipliers 1K to 64K, respectively, and such outputs of the multipliers 1K to 64K are individually integrated successively by being added to such data in the past delayed by the delaying sections 1G to 64G to correct the output levels to the tap coefficient multiplication sections 1E to 63E of the equalizer calculation section 602 so that the loop gain of the automatic equalizer 60 may be equal to or lower than 1.

Then, the error correction signals whose levels have been corrected by the tap coefficient level correction section 603 are outputted to the tap coefficient multiplication sections 1E to 63E of the equalizer calculation section 602. Consequently, the individual tap coefficients are corrected to optimum values by the equalizer calculation section 602 while the loop gain of the automatic equalizer 60 is kept equal to or lower than 1. Accordingly, the tap coefficients of the automatic equalizer 60 will not overflow, and an equalized output with a high degree of accuracy can be obtained.

The manner in which the data "ALPHA" for adjustment of the signal levels described above will be described below with reference to FIGS. 9 and 10. It is to be noted that like elements in FIG. 9 are denoted by like reference characters to those of FIG. 6.

Figure 9:
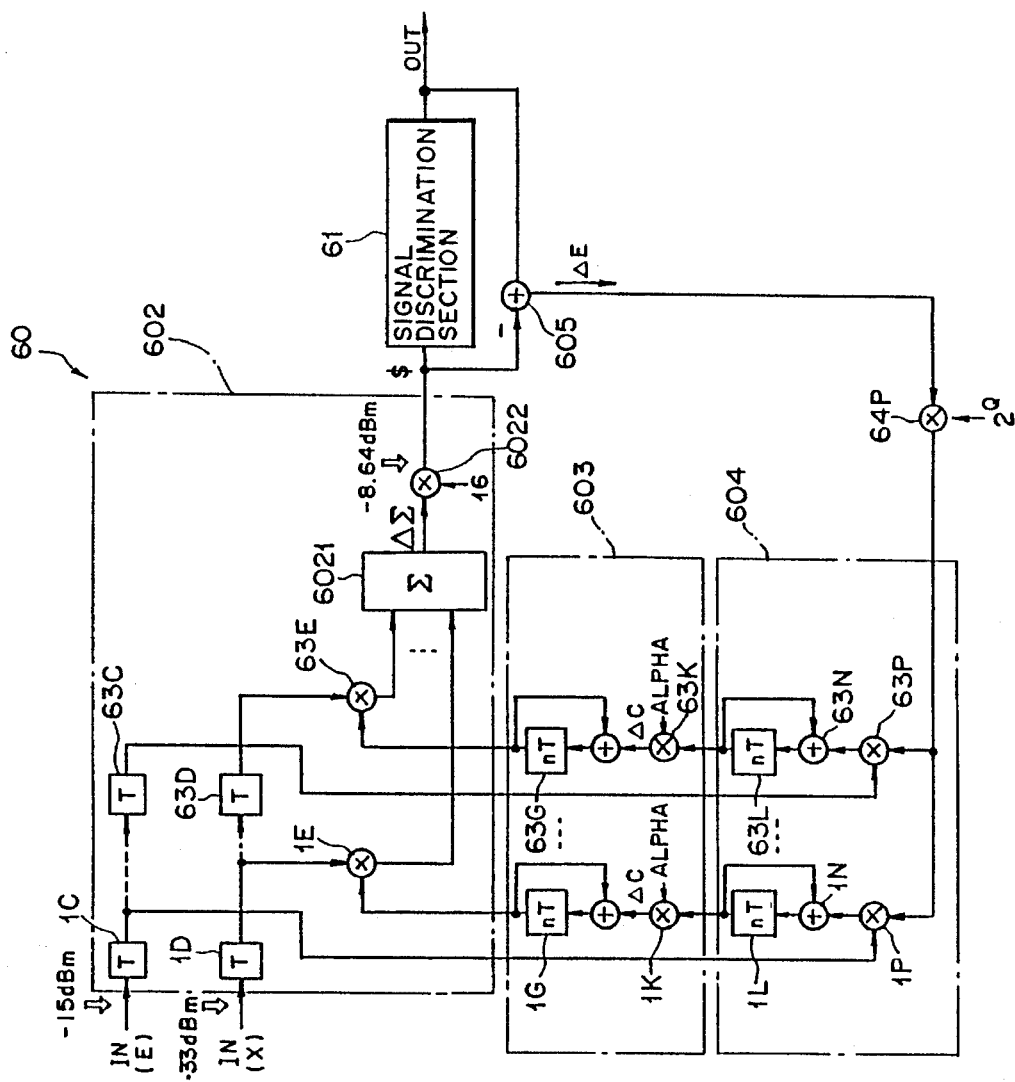
FIG. 9 is a diagrammatic view illustrating operation of the automatic equalizer shown in FIG. 5.

First, if it is assumed that, as seen in FIG. 9, the inputs to the delaying section 1C and the delaying section 1D are represented by "E" and "X", respectively, and the error amount after discrimination by the signal discrimination section 61 is, for example, $\Delta E=1.0$, then the increment $\Delta C$ of the tap coefficient from each of the multipliers 1K to 64K of the tap coefficient level correction section 603 is given by $$\Delta C = \Delta E \times 2^Q \times E \times m \times ALPHA \quad (1)$$
$$= 2^Q \times E^* \times m \times ALPHA$$

where m is the number of symbols in symbol averaging. In the present embodiment, since 5 symbol averaging of 64 tap correction is performed, m32 5.

Thus, if the number of taps of the equalizer is represented by n, then the output increment $\Delta \Sigma$ of the totaling calculation section 6021 can be represented as $$\Delta \Sigma = \sum_{i=1}^{n} \Delta C_i \times X_i = \Delta C_1 \times X_1 + \Delta C_2 \times X_2 + \quad (2)$$
$$\ldots + \Delta C_n \times X_n$$
$$= n \times 2^Q \times E \times m \times ALPHA \times X$$
$$= n \times 2^Q \times E \times m \times ALPHA \times E/8$$
$$(\because X = E/8)$$
$$= n \times 2^Q \times E^2 \times m \times ALPHA/8$$
$$= n \times 2^Q \times m \times ALPHA/8 \times E^2$$

Accordingly, the input increment $ to the signal discrimination section 61 is given by $$\$ = \Delta \Sigma \times 16 = 16 \times n \times 2^Q \times m \times ALPHA/8 \cdot E^2 \quad (3)$$
$$= 2nm \times 2^Q \times ALPHA \times E^2$$

Figure 10:
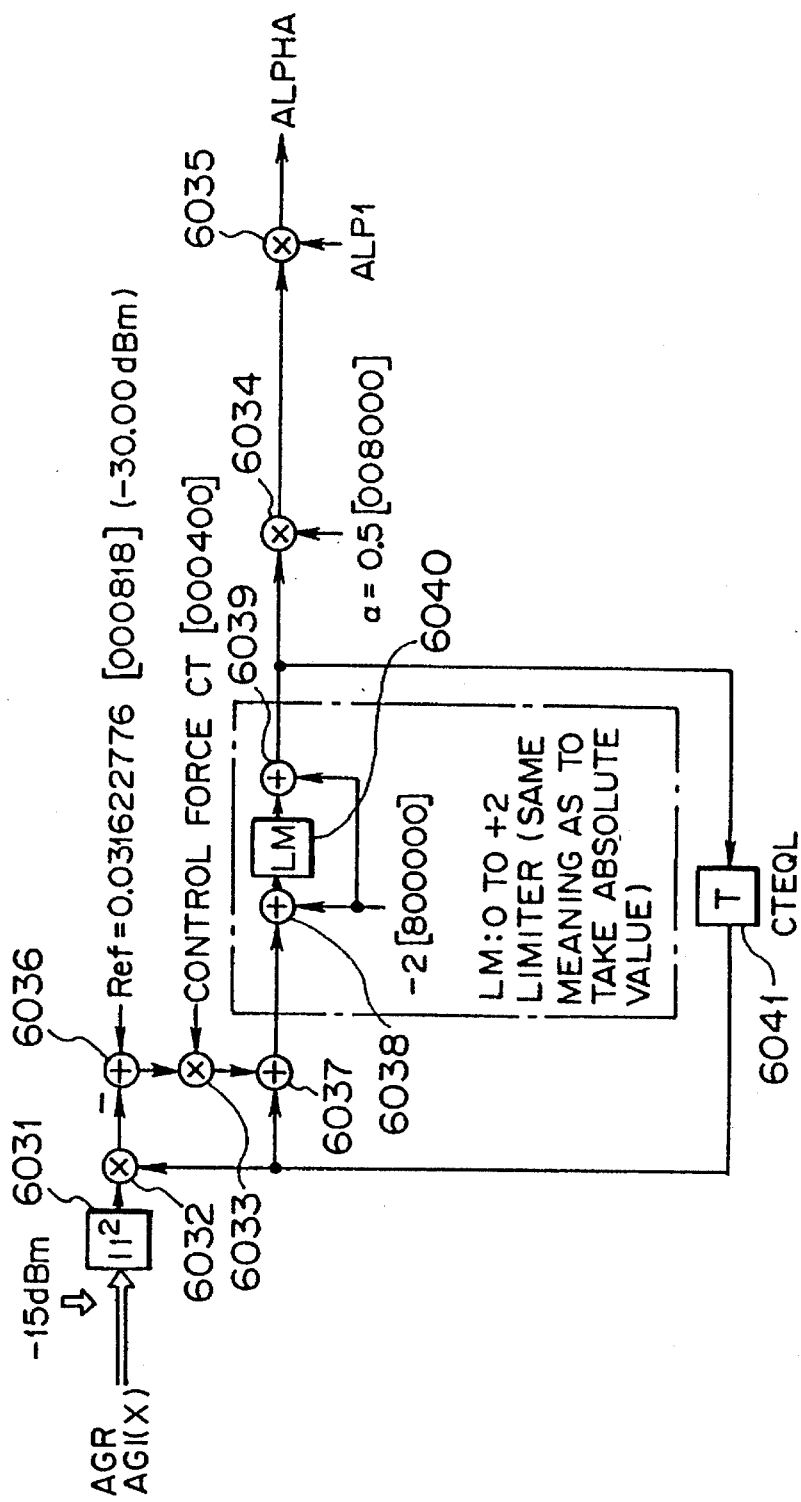
FIG. 10 is a diagrammatic view illustrating operation of the automatic equalizer shown in FIG. 5.

In this instance, the value of "ALPHA" is determined based on the input signal (AGR, AGI) to the automatic equalizer 60 by such a circuit as shown in FIG. 10 which includes a squaring calculation section 6031, four multipliers 6032 to 6035, four adders 6036 to 6039, a limiter (LM) 6040 and a delaying section (T, CTEQL) 6041. In particular, using a value obtained by squaring the absolute value of the input signal level "−15 dBm" (that is, $|-15 \text{ dBm}|^2=(10^{31}\,15/20)^2=0.031622776\,000818$) as a reference signal (Ref) to the adder 6036, where the input value to the delaying section (T) 6041 is represented by "X" and the output value of the delaying section (T) 6041 is represented by "CTEQL", $$X^2 \cdot CTEQL=0.031622776 \quad (4)$$

Accordingly, if "α" multiplied by the multiplier 6034 and "ALP1" multiplied by the multiplier 6035 are taken into consideration, the "ALPHA" can be represented as $$\text{ALPHA} = CTEQL \times 0.5 \times ALP1 \qquad (5)$$
$$= 0.031622776/E^2 \times 1/2 \times ALP1$$

Here, since the loop gain of the automatic equalizer 60 must be equal to or lower than "1", if, for example, the loop gain is 1.00, the input increment $ to the signal discrimination section 61 should be "1", and $$\$ = 2nm \times 2^Q \times 0.031622776 \times 1/2 \times ALP1 \qquad (6)$$
$$= nm \times 2^Q \times 0.031622776 \times ALP1$$
$$= 1$$

As a result, $$ALP1 = 1/(nm \times 2^Q \times 0.031622776) \qquad (7)$$

Then, "ALPHA" for correcting the output level of the tap coefficient error correction section 604 so that the loop gain of the automatic equalizer 60 may be equal to or lower than 1 is obtained from the equations (5) and (7). In short, as can be seen from the equations (5) and (7), the tap coefficient level correction section 603 corrects the output level of the tap coefficient error correction section 604 based on the input signal (AGR, AGI) to the automatic equalizer 60 and taking the number of taps of the automatic equalizer 60 into consideration. It is to be noted that reference numeral 6040 denotes a limiter which provides an absolute value of a signal level.

In this manner, even if the tap number of the automatic equalizer 60 is increased because it is used for the reception section 22 (refer to FIG. 4) for a very high speed modem whose transmission speed is, for example, 28.8 kbps, error correction of tap coefficients of the automatic equalizer 60 can be performed with certainty while maintaining a high degree of accuracy, and an accurate equalization signal can be obtained.

It is to be noted that, while the automatic equalizer 60 of the embodiment described above is constructed so as to be used for a very high speed modem whose transmission speed is, for example, 28.8 kbps, similar effects or advantages to those of the embodiment described above can be achieved also where it is used for any other data transmission apparatus. Accordingly, even if the automatic equalizer 60 of the present embodiment is applied not to a modem of the non-Nyquist transmission system but to a modem of the Nyquist transmission system, an equalized signal of a high degree of accuracy can be obtained similarly as in the present embodiment.

The present invention is not limited to the specifically described embodiment, and variations and modifications may be made without departing from the scope of the present invention.

What is claimed is:

1. An automatic equalizer, comprising:

an equalization calculation section including a plurality of delaying sections, a tap coefficient multiplication section and a totaling calculation section;

a tap coefficient error correction section for correcting errors of tap coefficients for said equalization calculation section based on an input from an input level setting section and an output from said automatic equalizer; and said input level setting section for setting an input signal level to said equalization calculation section and an input signal level to said tap coefficient error correction section to levels different from each other.

2. An automatic equalizer as claimed in claim 1, wherein said input level setting section includes a branching section for branching an input signal into two systems, and a level variation section for varying a level of one of the branched signals branched by said branching section which is to be inputted to said equalization calculation section.

3. An automatic equalizer as claimed in claim 2, wherein said level variation section varies the level of the signal to said equalization calculation section so as to secure a bit accuracy necessary for error correction of an output of said equalizer.

4. An automatic equalizer as claimed in claim 2, wherein one of the branched signals branched by said branching section which is to be inputted to said tap coefficient error correction section is inputted to said tap coefficient error correction section after a delay corresponding to a delay provided by said equalization calculation section.

5. An automatic equalizer as claimed in claim 1, further comprising a tap coefficient level correction section for correcting an output level of said tap coefficient error correction section so that said automatic equalizer may have a loop gain equal to or lower than 1.

6. An automatic equalizer as claimed in claim 5, wherein said tap coefficient level correction section corrects the output level of said tap coefficient error correction section based on an input signal to said automatic equalizer and taking a number of taps of said equalization calculation section into consideration.

\* \* \* \* \*